(12) United States Patent
Kim (10) Patent No.: US 12,012,185 B2
(45) Date of Patent: Jun. 18, 2024

(54) MARINE WIND POWER GENERATION FLOATING BODY

(71) Applicant: ACE E&T (ENGINEERING & TECHNOLOGY), Ulsan (KR)

(72) Inventor: Day Hwan Kim, Ulsan (KR)

(73) Assignee: ACE E&T (ENGINEERING & TECHNOLOGY), Ulsan (KR)

( * ) Notice: Subject to any disclaimer, the term of this patent is extended or adjusted under 35 U.S.C. 154(b) by 312 days.

(21) Appl. No.: 17/440,967

(22) PCT Filed: Nov. 19, 2019

(86) PCT No.: PCT/KR2019/015892
§ 371 (c)(1),
(2) Date: Sep. 20, 2021

(87) PCT Pub. No.: WO2021/029491
PCT Pub. Date: Feb. 18, 2021

(65) Prior Publication Data
US 2022/0161904 A1    May 26, 2022

(30) Foreign Application Priority Data

Aug. 14, 2019    (KR) .................... 10-2019-0099675

(51) Int. Cl.
*B63B 75/00*    (2020.01)
*B63B 35/44*    (2006.01)
(Continued)

(52) U.S. Cl.
CPC ............ *B63B 35/44* (2013.01); *B63B 39/005* (2013.01); *F03D 13/25* (2016.05);
(Continued)

(58) Field of Classification Search
CPC . B63B 35/44; B63B 39/005; B63B 2035/446; F03D 13/25; F05B 2240/93; F05B 2240/95
(Continued)

(56) References Cited

U.S. PATENT DOCUMENTS 9,394,035 B2 * 7/2016 Dagher .................... B63B 75/00
10,087,915 B1 * 10/2018 Srinivasan .............. F03D 13/25
(Continued)

FOREIGN PATENT DOCUMENTS

JP    2010-234965 A    10/2010

OTHER PUBLICATIONS

International Search Report for PCT/KR2019/015892 dated May 13, 2020.

*Primary Examiner* — James J Buckle, Jr.
(74) *Attorney, Agent, or Firm* — The PL Law Group, PLLC (57) ABSTRACT

A marine wind power generation floating body according to an embodiment of the present disclosure can be coupled to a tower used for wind power generation and is provided at sea. The marine wind power generation floating body includes a floating main body which is formed at a predetermined length and which has a circular transverse cross section, a ballast part positioned on one side of the floating main body, a damping plate positioned at one end of the floating main body, and formed with a diameter that is larger than the outer diameter of one side of the floating main body, and a pitching/rolling damping part which is positioned on the other side of the floating main body, and which damps the horizontal pitching and rolling of the floating main body.

5 Claims, 6 Drawing Sheets

(51) Int. Cl.
*B63B 39/00* (2006.01)
*F03D 13/25* (2016.01)

(52) U.S. Cl.
CPC ..... *B63B 2035/446* (2013.01); *F05B 2240/93* (2013.01); *F05B 2240/95* (2013.01)

(58) Field of Classification Search
USPC ........................................................ 52/292
See application file for complete search history.

(56) References Cited

U.S. PATENT DOCUMENTS

| | | | |
|---|---|---|---|
| 10,202,170 B2 * | 2/2019 | Dagher | F03D 13/40 |
| 10,526,056 B1 * | 1/2020 | Hakki | F03D 1/025 |
| 2011/0037264 A1 * | 2/2011 | Roddier | B63B 35/44 |
| | | | 290/55 |
| 2013/0052015 A1 | 2/2013 | Velund | |
| 2014/0234105 A1 | 8/2014 | Tolo | |
| 2015/0259050 A1 * | 9/2015 | Tunbjer | F03D 13/25 |
| | | | 114/264 |
| 2015/0275850 A1 * | 10/2015 | Numajiri | F03D 13/25 |
| | | | 290/55 |
| 2015/0329180 A1 | 11/2015 | Tominaga | |
| 2016/0101833 A1 | 4/2016 | Gilloteaux et al. | |
| 2019/0367136 A1 * | 12/2019 | Gatescoupe | B63B 35/44 |
| 2021/0222678 A1 * | 7/2021 | Ross | B63B 75/00 |
| 2021/0231105 A1 * | 7/2021 | de Souza | B63B 35/44 |
| 2021/0276673 A1 * | 9/2021 | Boo | F03D 13/25 |
| 2022/0128035 A1 * | 4/2022 | He | B63B 1/125 |
| 2023/0281527 A1 * | 9/2023 | Cella | G05B 19/41885 |
| | | | 705/7.17 |

* cited by examiner

MARINE WIND POWER GENERATION FLOATING BODY

CROSS-REFERENCE TO RELATED APPLICATIONS

This application claims benefit under 35 U.S.C. 119(e), 120, 121, or 365(c), and is a National Stage entry from International Application No. PCT/KR2019/015892, filed Nov. 19, 2019, which claims priority under 35 U.S.C. § 119 of Korean Patent Application No. 10-2019-0099675, filed on Aug. 14, 2019, the entire contents of which are hereby incorporated by reference.

BACKGROUND

1. Technical Field

Embodiments of the present invention relates to a marine wind power generation floating body.

2. Background Art

In general, the wind power generation converts wind energy into mechanical energy by using a device such as a wind turbine, and operates a power generator to produce electricity by using this energy. Here, the wind power generation is classified into an onshore-type wind power generation and an offshore-type wind power generation according to an installation place of the wind power generator. In recent years, among the wind power generations, researches and developments on a floating-type marine wind power generation having a lower structure that is floating at sea instead of being fixed to a seafloor are actively performed.

Here, a main structure of the floating-type marine wind power generation is classified into a spar buoy, a tension leg platform (TLP), and semi-submergible according to a system safety maintaining method and an installation water depth.

However, the semi-submergible floating body requires a large and heavy structure to provide safety. Also, in case of the tension leg platform floating body, a great load acts on a mooring and anchoring system, and an installation working is not easy.

Thus, improvement on a structure capable of adopting the cylindrical marine wind power generation floating structure having a small water plane and safety of a deep draft and simultaneously reducing a horizontal rolling (pitching) that is generated as a depth height is lowered due to the small water plane is required.

SUMMARY

Embodiments of the present invention provide a marine wind power generation floating body capable of being easily installed and used even in the deep sea having a water depth of 60 m or more in the remote sea.

Embodiments of the present invention also provide a marine wind power generation floating body capable of stably operating as a horizontal pitching and rolling is reduced in a state of standing on the sea.

Embodiments of the present invention also provide a marine wind power generation floating body capable of stably operating as a vertical heaving is reduced in a state of standing on the sea.

Embodiments of the present invention also provide a marine wind power generation floating body capable of performing damping on shakings and vibrations regardless of an acting direction of an external force such as wave power or wind power when a horizontal pitching and rolling is generated in an installed state of standing on the sea.

Embodiments of the present invention also provide a marine wind power generation floating body capable of fixing a floating main body at a specific position in case of emergency by manipulating an inner ballast.

According to an embodiment of the present invention, a marine wind power generation floating body, which is coupled to a tower used for wind power generation and is installed on the sea, includes: a floating main body having a predetermined length and a circular transverse cross-section; a ballast part positioned on one side of the floating main body; a damping plate positioned at one end of the floating main body and having a diameter greater than an outer diameter of one side of the floating main body; and a pitching/rolling damping part positioned on the other side of the floating main body to damp a horizontal pitching and rolling of the floating main body.

The pitching/rolling damping part may include at least three damping members radially arranged outside the floating main body, and the at least three damping members may be positioned at a water plane when the floating main body stands on the sea.

Each of the at least three damping members may include a hollow liquid accommodation part, the pitching/rolling damping part may further include at least three flowage members configured to connect two adjacent damping members among the at least three damping members, at least three liquid accommodation parts may communicate with each other through the at least three flowage members, and liquid may be accommodated in the at least three flowage members and the at least three liquid accommodation parts.

The at least three damping members may be provided in four, the four damping members may be arranged with an equal distance, and each of the four damping members may have a cylindrical shape having the same diameter.

The floating main body may further include a protruding damping part positioned between the ballast part and the pitching/rolling damping part, and the protruding damping part may have an outer diameter greater than the outer diameter of one side of the floating main body.

The protruding damping part may include a tapered portion formed on one of one end and the other end in a longitudinal direction thereof and having an outer surface inclined to the longitudinal direction.

The floating main body may include: a first wall and a second wall, which are spaced apart from each other in a radial direction thereof and each of which has a cylindrical shape having a predetermined diameter, and an auxiliary ballast positioned between the first wall and the second wall.

The auxiliary ballast may be formed with a ring shape along a circumferential direction of the floating main body.

The first wall may form an outer surface of the floating main body, and the ballast part may be positioned inside the second wall.

According to the embodiments of the present invention, the marine wind power generation floating body may be easily installed even in the deep sea having the water depth of 60 m or more in the remote sea.

Also, according to the embodiments of the present invention, the marine wind power generation floating body may stably operate in the state of standing on the sea because the horizontal pitching and rolling is reduced.

Also, according to the embodiments of the present invention, the marine wind power generation floating body may stably operate in the installed state of standing on the sea because the vertical heaving is reduced.

Also, according to the embodiments of the present invention, the marine wind power generation floating body may perform the damping on the shaking and vibration regardless of the acting direction of the external force such as the wave power or the wind power when the horizontal pitching and rolling is generated in the installed state of standing on the sea.

Also, according to the embodiments of the present invention, the floating main body may be fixed at a specific position in case of emergency through manipulation of the inner ballast part.

BRIEF DESCRIPTION OF THE DRAWINGS

(a) of FIG. 6 is a view illustrating a state in which a ballast part of a wind power generation floating body according to another embodiment of the present invention is positioned in a floating main body at a normal time, and (b) of FIG. 6 is a view illustrating a state in which the ballast part of the wind power generation floating body according to another embodiment of the present invention is dropped in case of emergency.

DETAILED DESCRIPTION

Hereinafter, preferred embodiments of the present invention will be described with reference to the accompanying drawings. However, this is merely an example, and the embodiments of the present invention are not limited thereto.

Moreover, detailed descriptions related to well-known functions or configurations will be ruled out in order not to unnecessarily obscure subject matters of the present invention. Also, terms used in this specification are terms defined in consideration of functions according to embodiments, and thus the terms may be changed according to the intension or usage of a user or operator. Therefore, the terms should be defined on the basis of the overall contents of this specification.

The description of the present invention is intended to be illustrative, and those with ordinary skill in the technical field of the present invention pertains will be understood that the present invention can be carried out in other specific forms without changing the technical idea or essential features. Hence, the real protective scope of the present invention shall be determined by the technical scope of the accompanying claims.

Figure 1:
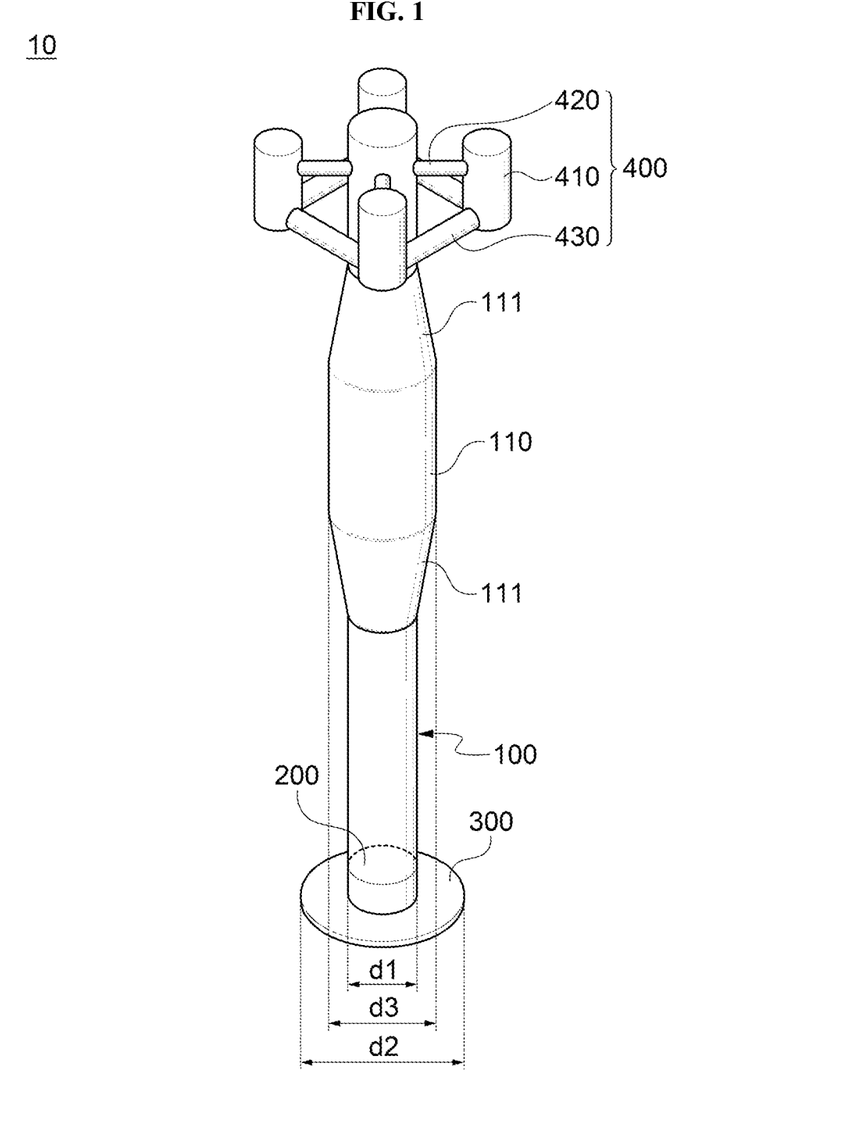
FIG. 1 is a view illustrating a marine wind power generation floating body according to an embodiment of the present invention.

FIG. 1 is a view illustrating a marine wind power generation floating body 10 according to an embodiment of the present invention.

Referring to FIG. 1, the marine wind power generation floating body 10 according to an embodiment of the present invention may be coupled to a tower including a blade and a nacelle and installed at sea in a floating state. Here, the marine wind power generation floating body 10 according to an embodiment of the present invention may include a floating main body 100 having a predetermined length, a ballast part 200, a damping plate 300 positioned at one end of the floating main body 100, and a pitching/rolling damping part 400 positioned on the other side of the floating main body 100.

Here, the above-described one side or one end may represent a lower side or a lower end when the marine wind power generation floating body 10 according to an embodiment of the present invention stands at sea. However, the embodiment of the present invention is not limited thereto. The one side or the one end may represent one side of both sides in a longitudinal direction when the floating main body 100 is positioned in a horizontal direction.

Specifically, the above-described floating main body 100 may have a circular transverse cross section. That is, the floating main body 100 may have a cylindrical shape that is a hollow cylindrical shape having an empty inside. Since an outer circumferential surface perpendicular to a longitudinal direction of the floating main body 100 has a circular shape, an effect caused by a tidal current or a wave power acting on the floating main body 100 when installed at sea may be constant regardless of an acting direction.

Also, the ballast part 200 may be positioned on one side in the floating main body 100. Here, the ballast part 200 may have a specific gravity greater then water and be formed by a rigid body made of a concrete material. That is, the ballast part 200 may be positioned at an inner lower side of the floating main body 100 when the floating main body 100 stands in a direction perpendicular to the sea surface to adjust a center of gravity of the marine wind power generation floating body 10 according to an embodiment of the present invention to the lower side. Through this, the marine wind power generation floating body 10 according to an embodiment of the present invention may have a center of gravity positioned lower than a center of buoyancy as a draft depth increases.

Also, the damping plate 300 may have a circular plate shape having a diameter d2 greater than an outer diameter d1 of one side of the floating main body 100. Here, as the damping plate 300 may have a predetermined thickness along a predetermined thickness along the longitudinal direction of the floating main body 100 and the diameter d2 greater than the outer diameter d1 of one side of the floating main body 100, when the marine wind power generation floating body 10 according to an embodiment of the present invention is installed in a standing on the sea manner, vertical heaving thereof may be damped.

The above-described pitching/rolling damping part 400 may be positioned at an opposite side of the damping plate 300 based on the vertical direction (or longitudinal direction) of the floating main body 100. That is, the pitching/rolling damping part 400 may be positioned above the floating main body 100. The above-described pitching/rolling damping part 400 may be positioned at a water plane above the floating main body 100, and, through this, a horizontal pitching of the floating main body 100 may be damped.

The floating main body 100 may further include a protruding damping part 110 positioned between the ballast 200 and the pitching/rolling damping part 400. Here, the protruding damping part 110 may have an outer diameter d3 greater than the outer diameter d1 of one side of the floating main body 100. Preferably, the outer diameter d3 of the protruding damping part 110 may be greater than the outer diameter d1 of one side of the floating main body 100 and less than the diameter d2 of the damping plate 300.

Specifically, the protruding damping part 110 may include a tapered portion 111 formed on at least one end and the other end of a longitudinal direction thereof and having an outer surface inclined in the longitudinal direction thereof. That is, the tapered portion 111 may be formed on at least one of an upper end and a lower end of the protruding damping part 110 when the floating main body 100 stands on the sea. Preferably, the tapered portion 111 may be formed on all of the upper end and the lower end of the protruding damping part 110 and inclined so that the upper tapered portion 111 has an outer diameter of a cross-section perpendicular to the longitudinal direction, which gradually increases in a downward direction, and the lower tapered portion 111 has an outer diameter of a cross-section perpendicular to the longitudinal direction, which gradually decreases in the downward direction.

In addition to the above-described damping plate 300, the vertical heaving of the floating main body 100 may be further damped through the protruding damping part 110. Furthermore, as the tapered portion 111 may be formed inclined to an external force acting in the horizontal direction and distribute the horizontal external force along the inclined surface, horizontal pitching that allows the floating main body 100 in the stand state to be inclined.

Figure 2:
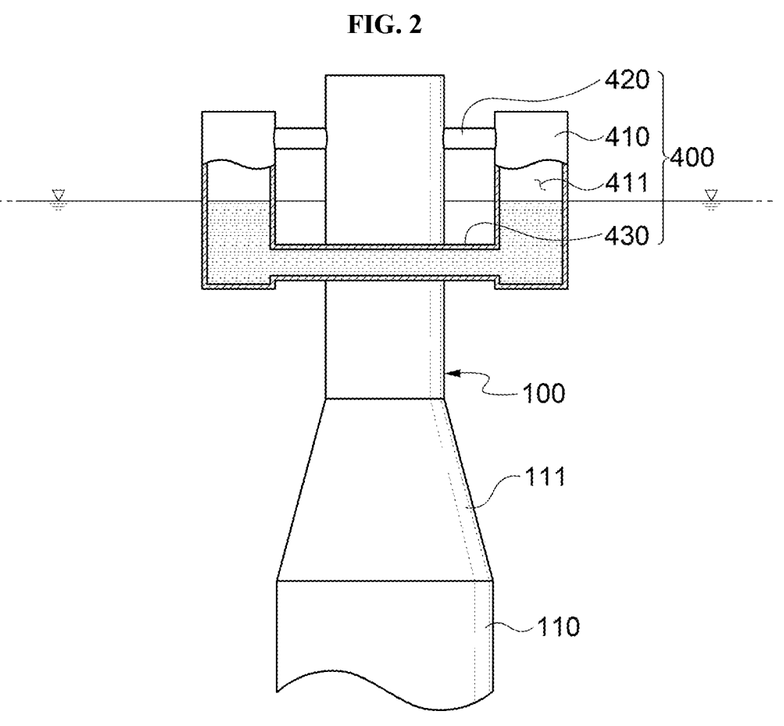
FIG. 2 is a view illustrating a position relationship with a water plane when the marine wind power generation floating body 10 according to an embodiment of the present invention is installed on the sea.

FIG. 2 is a view illustrating a position relationship with the water plane when the marine wind power generation floating body 10 according to an embodiment of the present invention is installed on the sea.

Referring to FIG. 2, the pitching/rolling damping part 400 may include at least three damping members 410 radially arranged at the outside of the floating main body 100 and at least three connection members 420 for connecting each of the at least three damping members 410 to the floating main body 100. Here, the at least three damping members 410 may be positioned at the water plane when the floating main body 100 stands on the sea.

As illustrated in FIG. 2, the meaning of a feature in which the at least three damping members 410 are positioned at the water plane may include a state in which an upper end of the damping member 410 is positioned at the water plane, and a lower end of the damping member 410 is positioned at the water plane in addition to a state in which a central portion of the damping member 410 is positioned at the water plane. That is, a state in which the damping member 410 contacts the water plane immediately when the horizontal pitching and rolling is generated as well as a state in which the damping member 410 is positioned at the water plane when the floating main body 100 stands on the sea may be included.

The at least three connection members 420 may be positioned above the water plane instead of contacting seawater when the floating main body 100 stands on the sea. Through this, a water plane area (i.e., a cross-sectional area positioned at the water plane) of the marine wind power generation floating body 10 according to an embodiment of the present invention may be minimized, and the vertical heaving in the longitudinal direction of the floating main body 100 may be reduced.

Although at least three connection members 420 are disposed parallel to the water plane in the present invention, the embodiment of the present invention is not limited thereto. For example, the connection member 420 may be disposed inclined to the water plane between the floating main body 100 and the damping member 410, or two connection members may be arranged in X-shape or parallel to the water plane.

Each of the at least three damping members 410 may include a hollow liquid accommodation part 411 formed therein, and the pitching/rolling damping part 400 may further include at least three flowage members 430 for connecting two adjacent damping members 410 among the at least three damping members 410. Here, the liquid accommodation part 411 may represent a hollow space formed in each of the damping members 410.

Also, at least three liquid accommodation parts 411 may communicate with each other through the at least three flowage members 430, and liquid for damping action on the horizontal pitching and rolling may be accommodated in the at least three flowage members 430 and the at least three liquid accommodation parts 411.

Also, the at least three flowage members 430 may be positioned at lower ends of the at least three damping members 410 or disposed below the water plane in a state of being submerged into seawater when the floating main body 100 stands on the sea. Through this, the water plane area of the marine wind power generation floating body 10 according to an embodiment of the present invention may be minimized, and the vertical heaving in the longitudinal direction of the floating main body 100 may be reduced. Also, since all of the at least three flowage members 430 are positioned at the lower ends in longitudinal directions of the damping members 410, the liquid positioned in the at least three damping members 410 may freely flow through the at least three flowage members 430.

When the damping action of the accommodated liquid on the horizontal pitching and rolling of the floating main body 100 is described in detail, as described above, the inside of each of the at least three damping members 410 and the at least three flowage members 430 may be formed as a hollow empty space, and the liquid may be accommodated and disposed in each of the at least three damping members 410 and the at least three flowage members 430.

Through this, when the floating main body 100 is inclined to one side as the horizontal pitching and rolling is generated to the floating main body 100 due to wave power or wind power, the inner fluid may move through an inner wall of the flowage member 430 by own weight and inertia thereof to damp the pitching, and when the floating main body 100 is inclined to the other side, the inner fluid may provide a restoration force that pushes the inner wall of the flowage member 430 or a wall of the liquid accommodation part 411 to one side that is opposite to the inclined direction.

As described above, the liquid accommodated in the at least three flowage members 430 and the at least three liquid accommodation parts 411 may increase damping on an external force when the horizontal pitching and rolling of the floating main body 100 to damp the horizontal pitching and rolling of the floating main body 100.

Since the at least three damping members 410 are radially arranged, the damping action performed by the liquid accommodated in the liquid accommodation part 411 and the flowage member 430 may act uniformly in all directions along a circumferential direction of the floating main body 100.

Furthermore, each of the liquid accommodated inner spaces of the flowage member 430 and the liquid accommodation part 411 may have a cylindrical shape, and when a vibration is generated to the inner liquid by the horizontal pitching and rolling of the floating main body 100, a wave break in a specific direction may be prevented to smoothly reduce a shaking or a vibration in all directions.

Also, the above-described liquid may be accommodated upto a height of ¼ to ¾ in the longitudinal direction of the damping member 410 when the floating main body 100 stands on the sea instead of being accommodated fully to fill the inside of each of the liquid accommodation part 411 and the flowage member 430 in order to further easily perform the damping action on the rolling and pitching of the floating main body 100.

That is, as an extra space in which the liquid is not disposed is provided in the damping member 410, when the floating main body 100 is inclined to one direction (e.g., a left side), a liquid accommodation amount of the liquid accommodation part 411 disposed at the inclined direction (the left side) may be greater than that of the rest liquid accommodation part 411, and when the floating main body 100 is inclined to the other direction (e.g., a right side), a damping action on the inclination in the other direction (the right side) in the liquid accommodation part 411, in which the liquid accommodation amount increases, may further increase.

Preferably, the above-described at least three damping members 410 may be provided in four, and four damping members 410 may be arranged radially with an equal distance with respect to the floating main body 100.

Also, each of the four damping members 410 may have a cylindrical shape having the same diameter and disposed parallel to the longitudinal direction of the floating main body 100. That is, each of the four damping members 410 may be positioned at the water plane in a state of standing on the sea when the floating main body 100 stands on the sea.

Figure 3:
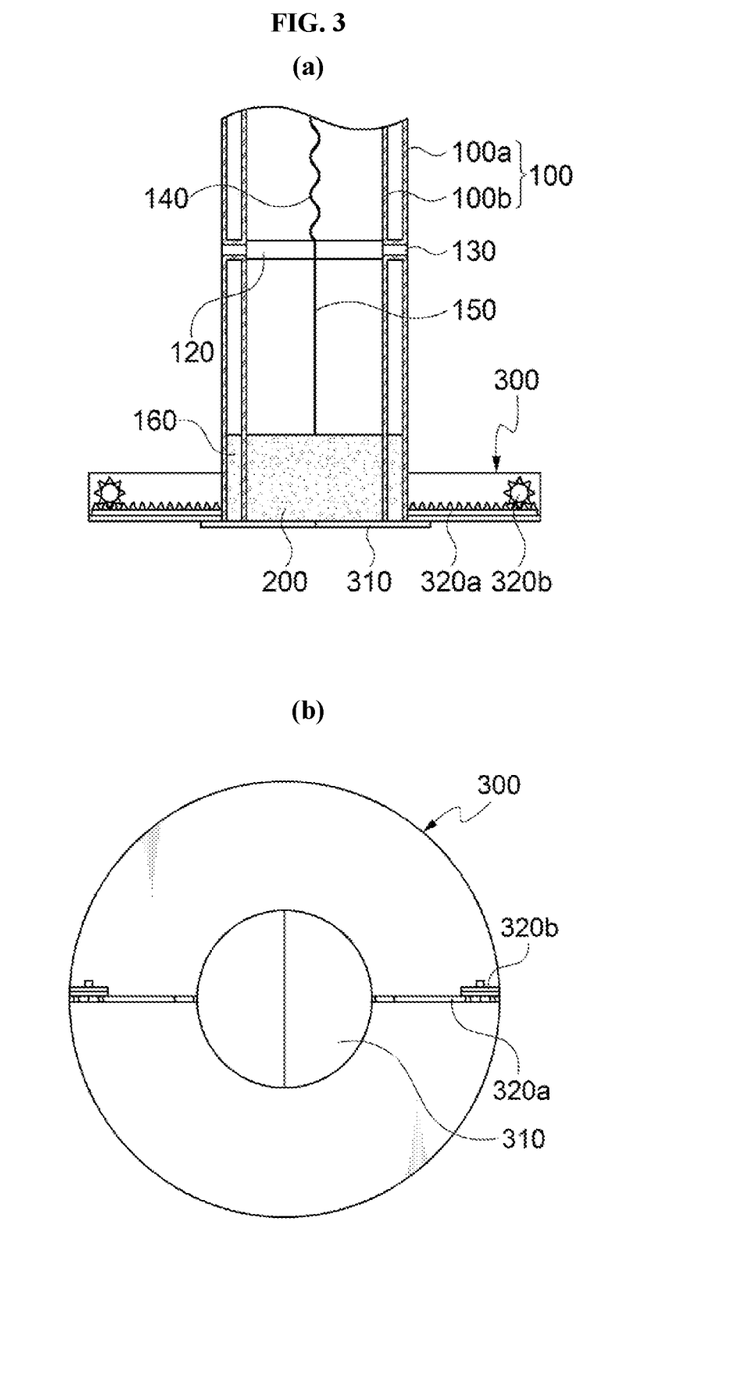
FIG. 3 is a view illustrating a state in which a ballast part of the marine wind power generation floating body according to an embodiment of the present invention is positioned in a floating main body at a normal time.

FIG. 3 is a view illustrating a state in which the ballast part 200 of the marine wind power generation floating body 10 according to an embodiment of the present invention is positioned in the floating main body 100 at a normal time. (a) of FIG. 3 is a view illustrating a lower structure of the marine wind power generation floating body 10 according to an embodiment of the present invention at the normal time in the longitudinal direction of the floating main body 100, and (b) of FIG. 3 is a bottom view illustrating the lower structure of the marine wind power generation floating body 10 according to an embodiment of the present invention at the normal time.

Referring to (a) and (b) of FIG. 3, the above-described floating main body 100 may include a first wall 100a and a second wall 100a, each of which has a cylinder shape having a predetermined diameter. Here, the first wall 100a and the second wall 100b may be spaced apart from each other in a radial direction and have that same central axis in a longitudinal direction thereof. That is the floating main body 100 may have a dual wall structure through the first wall 100a and the second wall 100b.

Also, the floating main body 100 may further include an auxiliary ballast 160 positioned between the first wall 100a and the second wall 100b. Here, the auxiliary ballast 160 may be positioned on one side of the floating main body 100 so as to be adjacent to the above-described ballast part 200.

Specifically, the auxiliary ballast 160 may have a ring shape along a circumferential direction of the floating main body 100. Also, the first wall 100a may form an outer surface of the floating main body 100, and the ballast part 200 may be positioned inside the second wall 100b.

The above-described auxiliary ballast 160 may be formed by pouring concrete into a space between the first wall 100a and the second wall 100b, and a pouring height may be adjusted according to purposes required in transfer and installation of the floating main body.

The auxiliary ballast part 160 may be formed by concrete pouring on the ground to improve a feature in which the concrete pouring on the sea is not easy, and a weight of the auxiliary ballast part 160 may allow towing of the floating main body 100 to the sea to be easily performed, separately from that the ballast part 200 moves a center of gravity to a lower side by being laminated in a block type and securing a necessary draft. Also, since a size and a weight of the ballast part 200 may be reduced as much as the weight of the auxiliary ballast 160, the ballast part 200 may be easily installed.

The above-described floating main body 100 may include a piston part 120 connected with the ballast part 200 to elevate inside the floating main body 100. Also, the floating main body 100 may have an openable one end, and as the one end of the floating main body 100 is opened, the ballast part 200 and the piston part 120 may move downward. When the piston part 120 moves downward in the floating main body 100, external liquid (seawater) may be introduced from above the piston part 120.

Specifically, the damping plate 300 may include at least one opening and closing plate 310 capable of opening or closing one end of the floating main body 100. Also, as the above-described at least one opening and closing plate 310 is manipulated, one end of the floating main body 100 may be opened. Here, although at least one opening and closing plate 310 may be provided in one pair, the embodiment of the present invention is not limited thereto.

More specifically, the above-described damping plate 300 may include a rack 320a coupled to each of one pair of opening and closing plates 310 and a pinion 320b that is driven to move the rack 320a and each of the opening and closing plates 310 in a sliding manner.

That is, when the pinion 320b is driven, the opening and closing plate 310 may move in the sliding manner through the rack 320a. The above-described pinion 320b and the rack 320a may be formed in one pair in correspondence to the one pair of opening and closing plates 310.

Also, at least one seawater inflow hole 130 may be formed on one side of the floating main body 100 along the circumferential direction at a preset height from a bottom surface of the floating main body 100. Preferably, a plurality of seawater inflow holes 130 may be arranged along the circumferential direction of the floating main body 100 to communicate the inside and the outside of the floating main body 100.

Also, the above-described preset height may represent a height from the bottom surface at which the piston part 120 is positioned in the floating main body 100 at the normal time at which one end of the floating main body 100 is closed. That is, the piston part 120 may contact an inner circumferential surface of the floating main body 100 in a state in which the plurality of seawater inflow holes 130 are closed, and a sealing member (not shown) such as an O-ring may be positioned between the piston part 120 and the inner circumferential surface of the floating main body 100. Thus, the plurality of seawater inflow holes 130 may be closed by the piston part 120 at the normal time. The piston part 120 may be positioned at the preset height by an elastic fixing part 140 having a predetermined elasticity, and the elastic fixing part 140 may have one end connected to the piston part 120 and the other end fixed at a predetermined position of the floating main body 100.

Figure 4:
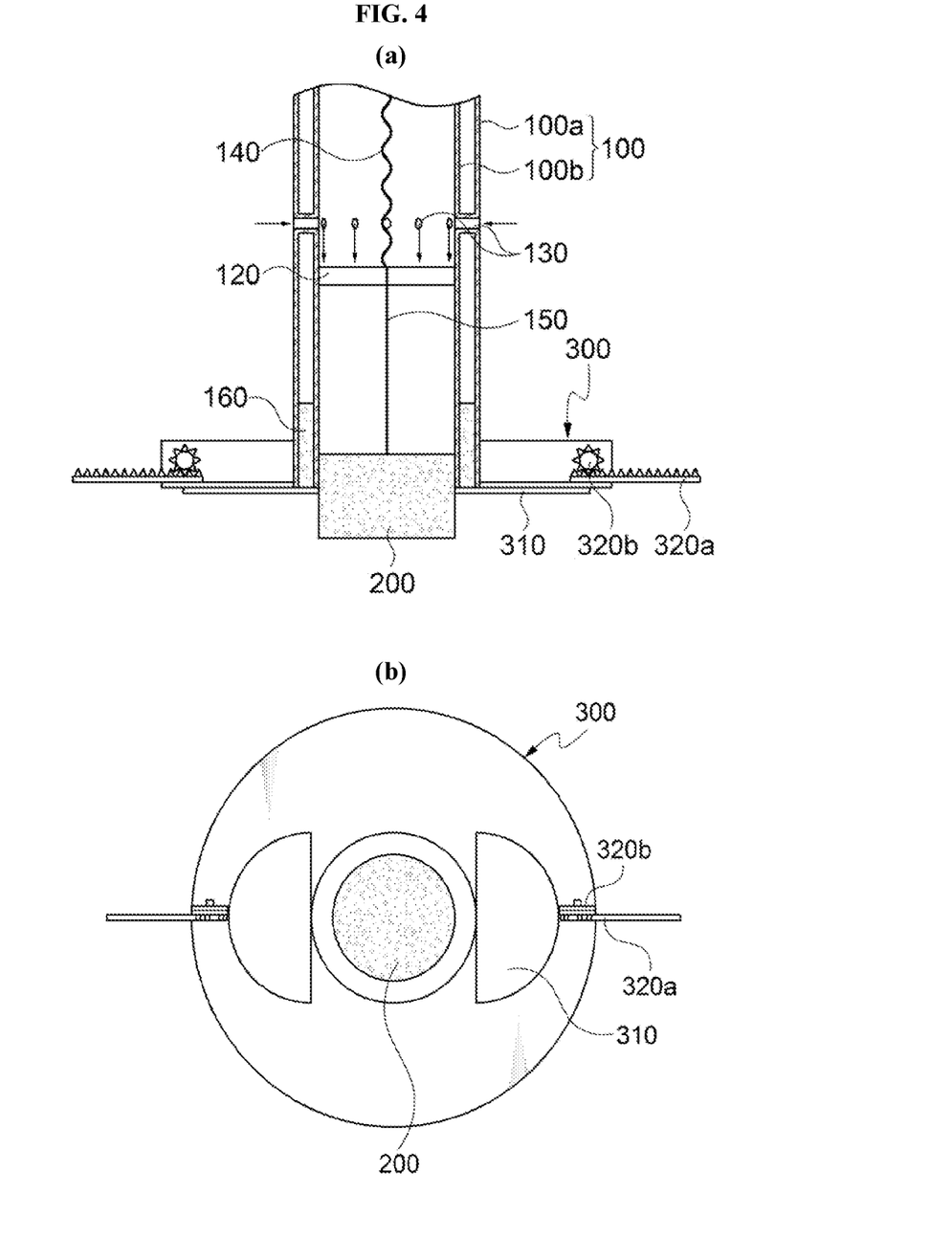
FIG. 4 is a view illustrating a state in which the ballast part of the marine wind power generation floating body according to an embodiment of the present invention is dropped in case of emergency.

FIG. 4 is a view illustrating a state in which the ballast part 200 of the marine wind power generation floating body 10 according to an embodiment of the present invention is dropped in case of emergency. (a) of FIG. 4 is a view illustrating a lower structure of the marine wind power generation floating body 10 according to an embodiment of the present invention in case of emergency in the longitudinal direction of the floating main body 100, and (b) of FIG. 4 is a bottom view illustrating the lower structure of the marine wind power generation floating body 10 according to an embodiment of the present invention in case of emergency.

Referring to (a) and (b) of FIG. 4, it may be shown that one end of the floating main body 100 is opened as the rack 320a and the opening and closing plate 310 moves in the sliding manner by driving the pinion 320b. Specifically, as the pinion 320b is rotation-driven, the rack 320a and the opening and closing plate 310, which are coupled to each other, may move in the sliding manner in a horizontal direction (i.e., a direction perpendicular to the longitudinal direction of the floating main body 100). Here, one end of the floating main body 100 may be opened, and the ballast part may move downward by own weight thereof.

Here, an anchor wire 150 for connecting the ballast part 200 and the piston part 120 to each other may be positioned therebetween, and the piston part 120 may move downward together by the anchor wire 150 as the ballast part 200 moves downward. The elastic fixing part 140 may be extended in a state in which both ends thereof are fixed to the piston part 120 and the predetermined position of the floating main body 100, respectively, by the downward movement of the piston part 120.

Also, as the piston part 120 moves downward, the plurality of seawater inflow holes 130 closed by the piston part 120 may be opened, and external fluid (seawater) may be introduced from above the piston part 120. The introduced external fluid may replace a ballast function of the ballast part 200.

Figure 5:
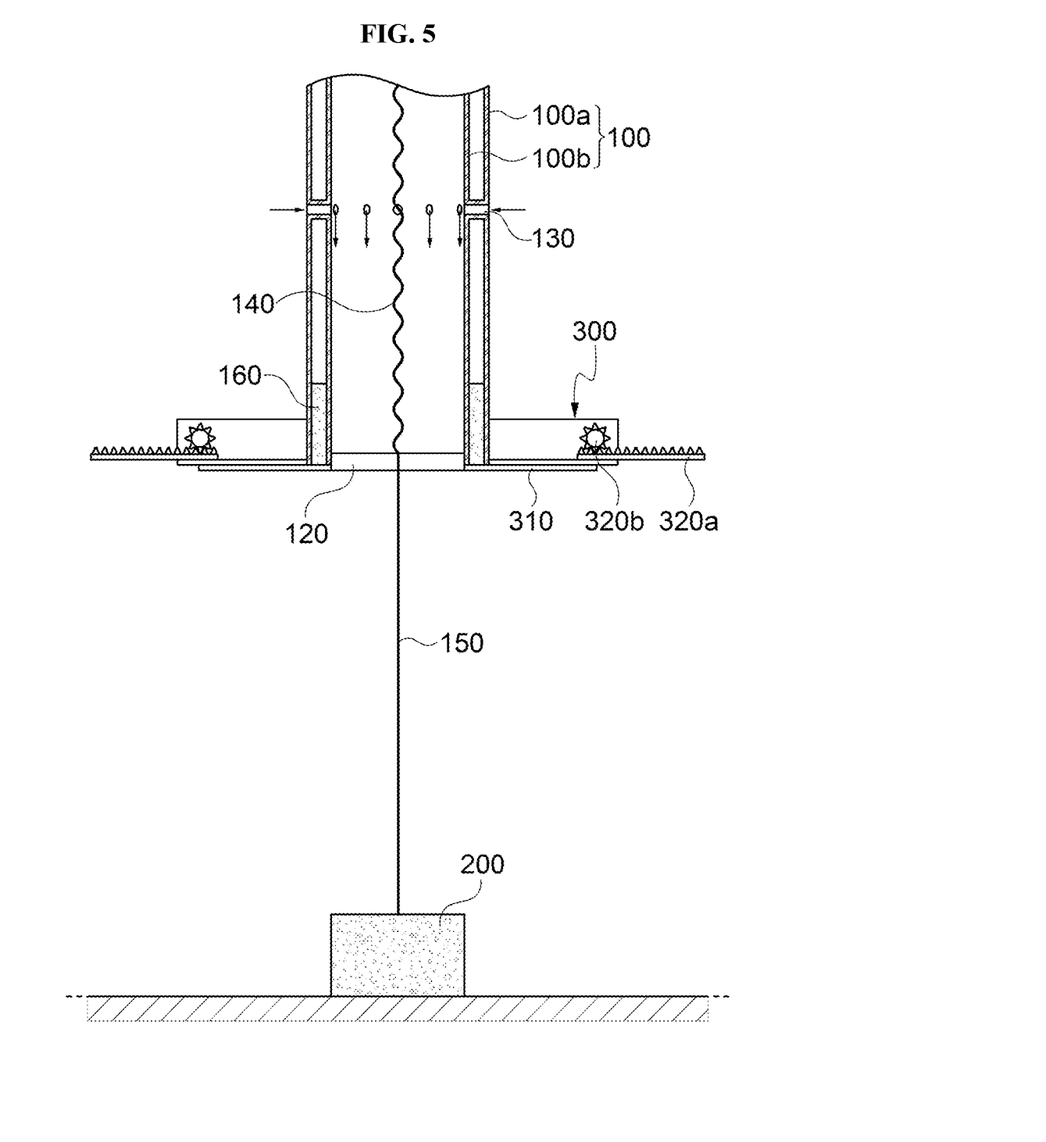
FIG. 5 is a view illustrating a state in which the ballast part of the marine wind power generation floating body according to an embodiment of the present invention is positioned on a seafloor in case of emergency.

FIG. 5 is a view illustrating a state in which the ballast part 200 of the marine wind power generation floating body 10 according to an embodiment of the present invention is dropped to a seafloor in case of emergency.

Referring to FIG. 5, when the piston part 120 moves downward, the piston part 120 may move until the predetermined position of the floating main body 100 by the elastic fixing part 140. Specifically, the piston part 120 may move until a position of one end of the floating main body 100 by the maximally extended elastic fixing part 140 and be positioned to close the one end of the floating main body 100. Also, the external fluid introduced through the plurality of seawater inflow hole 130 may be positioned above the piston part 120.

Through this, the external fluid (seawater) may be accommodated at an inner one side of the floating main body 100 from the bottom surface of the floating main body 100 until a shielding layer positioned at a predetermined height. Here, the external fluid introduced into the floating main body 100 may perform the ballast function on the marine wind power generation floating body 10 according to an embodiment of the present invention in a state in which the ballast part 200 moves downward and is seated on the seafloor.

Also, a wire adjustment part (not shown) may be installed between the above-described piston part 120 and the ballast part 200, and a length of the anchor wire may be adjusted through an operation of the wire adjustment part. Here, the wire adjustment part may be a wire winch including a drum member around which the anchor wire 150 is wound, and the wire winch may be positioned below the piston part 120.

The ballast part 200, which moves downward, may continuously move downward as the length of the anchor wire 150 extends through the wire adjustment part, and as the descended ballast part 200 is seated on the seafloor, the anchor wire 150 may be fixed while maintaining a predetermined tension.

Through this, in case of emergency such as an operation for maintenance of the marine wind power generation floating body 10 according to an embodiment of the present invention or a disassembling operation of the marine wind power generation floating body 10 according to an embodiment of the present invention, the ballast part 200 descended and seated on the seafloor may perform an anchor function. That is, the wind power generation floating body according to an embodiment of the present invention may be prevented from floating or moving from a current installation position by the ballast part 200 seated on the seafloor.

Figure 6:
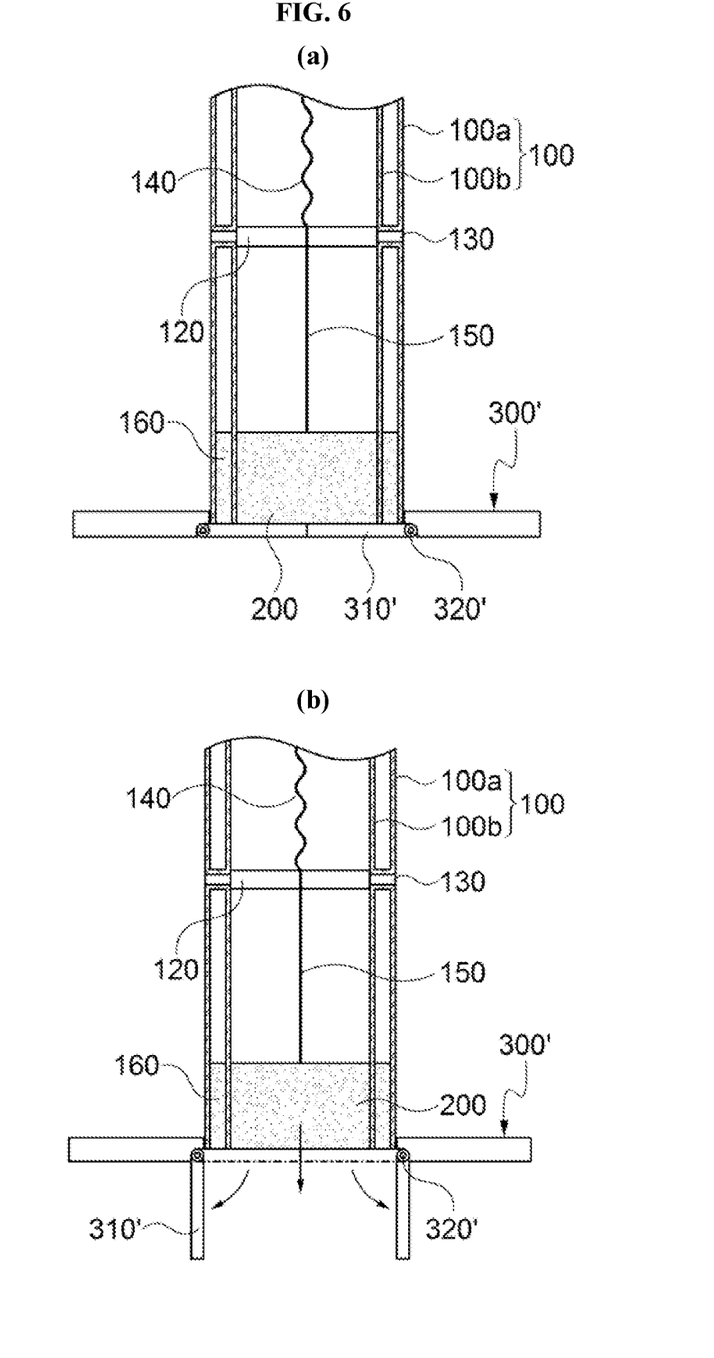

(a) of FIG. 6 is a view illustrating a state in which a ballast part 200 of a wind power generation floating body according to another embodiment of the present invention is positioned in a floating main body 100 at a normal time, and (b) of FIG. 6 is a view illustrating a state in which the ballast part 200 of the wind power generation floating body according to another embodiment of the present invention is dropped in case of emergency.

Referring to (a) and (b) of FIG. 6, the wind power generation floating body according to another embodiment of the present invention may include a floating main body 100, a ballast part 200, a protruding damping part 110, and a pitching/rolling damping part 400, which are the same as those of the wind power generation floating body 10 according to an embodiment of the present invention. The wind power generation floating body according to another embodiment of the present invention may also include a damping plate 300' at one end of the floating main body 100.

Specifically, the above-described damping plate 300' may have a diameter greater than an outer diameter d1 of one end of the floating main body 100 and damp a longitudinal heaving when the floating main body 100 stands on the sea. Also, the damping plate 300' may include at least one opening and closing plate 310' and a hinge shaft 320' coupled to an end of the opening and closing plate 310'. Here, the at least one opening and closing plate 310' may rotate around the hinge shaft 320', and as the opening and closing plate 310' rotates, one end of the floating main body 100 in a closed state may be opened.

Here, the above-described hinge shaft 320' may mechanically rotate by a driving motor (not shown), and as a stopper (not shown) is released by an external input signal in a state in which a rotation operation is restricted by the stopper, the opening and closing plate 310' may rotate around the hinge shaft 320'.

Although the wind power generation floating body according to another embodiment of the present invention is partially different in a driving method of the opening and closing plate 310' from the wind power generation floating body 10 according to an embodiment of the present invention, the rest components except for the opening and closing plate 310' may be the same as those of the wind power generation floating body 10 according to an embodiment of the present invention.

Also, the above-described opening and closing structure of one end of the floating body 100 of the opening and closing plate 310 and 310' may be manipulated by various methods such as a method of moving in the sliding manner by a hydraulic cylinder or a method of being completely separated from one end of the floating main body 100 that are adoptable by those skilled in the art instead of being limited to the above-described driving structure through the rack 320a and the pinion 320b or the above-described rotation structure of the hinge shaft 320'. That is, all sorts of methods of opening one end of the floating main body 100 by manipulating the opening and closing plate 310 and 310' to move or rotate may be acceptable.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the scope of this disclosure is defined not by the detailed description of the invention but by the appended claims, and all differences within the scope will be construed as being included in the present disclosure.

What is claimed is:

1. A marine wind power generation floating body that is to be coupled to a tower used for wind power generation and is to be installed on the sea, comprising:
    a floating main body having a predetermined length and a circular transverse cross-section;
    a ballast part positioned on one side of the floating main body;
    a damping plate positioned at one end of the floating main body and having a diameter greater than an outer diameter of one side of the floating main body; and
    a pitching/rolling damping part positioned on the other side of the floating main body to damp a horizontal pitching and rolling of the floating main body,
    wherein the pitching/rolling damping part is positioned above the floating main body when the floating main body stands on the sea, the pitching/rolling damping part comprises at least three damping members radially arranged outside the floating main body, and the at least three damping members are positioned at a water plane when the floating main body stands on the sea,
    wherein each of the at least three damping members comprises a hollow liquid accommodation part,
    the pitching/rolling damping part further comprises at least three flowage members configured to connect two adjacent damping members among the at least three damping members,
    at least three liquid accommodation parts communicate with each other through the at least three flowage members,
    all of the at least three flowage members are positioned at the lower ends in longitudinal directions of the damping members,
    liquid for damping action on the horizontal pitching and rolling of the floating main body is accommodated in the at least three flowage members and the at least three liquid accommodation parts,
    the liquid positioned in the at least three damping members is freely flow through the at least three flowage members,
    as an extra space in which the liquid is not disposed is provided in the damping member, when the floating main body is inclined to one direction, a liquid accommodation amount of the liquid accommodation part disposed at the inclined direction is greater than that of the rest liquid accommodation part, and when the floating main body is inclined to the other direction, a damping action on the inclination in the other direction in the liquid accommodation part, in which the liquid accommodation amount increases, further increases,
    the marine wind power generation floating body has a center of gravity positioned lower than a center of buoyancy as a draft depth increases when the floating main body stands on the sea,
    wherein the floating main body further comprises a protruding damping part positioned between the ballast part and the pitching/rolling damping part,
    the protruding damping part has an outer diameter greater than the outer diameter of one side of the floating main body, and the protruding damping part comprises a tapered portion formed on one of one end and the other end in a longitudinal direction thereof and having an outer surface inclined to the longitudinal direction.

2. The marine wind power generation floating body of claim 1, wherein the at least three damping members are provided in four;
    the four damping members are arranged with an equal distance; and
    each of the four damping members has a cylindrical shape having the same diameter.

3. The marine wind power generation floating body of claim 1, wherein the floating main body comprises:
    a first wall and a second wall, which are spaced apart from each other in a radial direction thereof and each of which has a cylindrical shape having a predetermined diameter; and
    an auxiliary ballast positioned between the first wall and the second wall.

4. The marine wind power generation floating body of claim 3, wherein the auxiliary ballast is formed with a ring shape along a circumferential direction of the floating main body.

5. The marine wind power generation floating body of claim 3, wherein the first wall forms an outer surface of the floating main body; and
    the ballast part is positioned inside the second wall.

* * * * *